L. SMIDO.
TIRE.
APPLICATION FILED AUG. 13, 1912.
1,067,768.
Patented July 15, 1913.
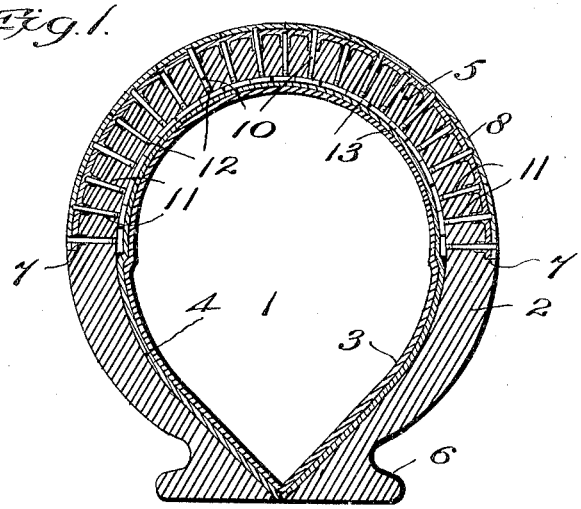
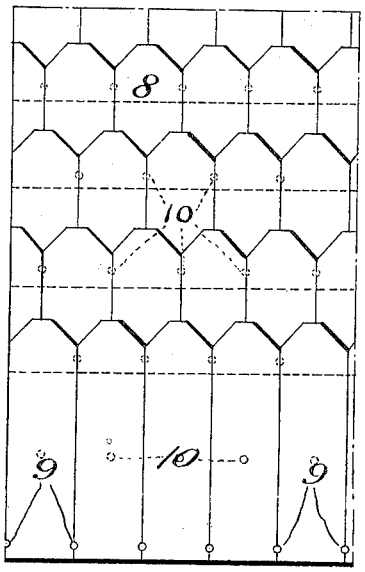
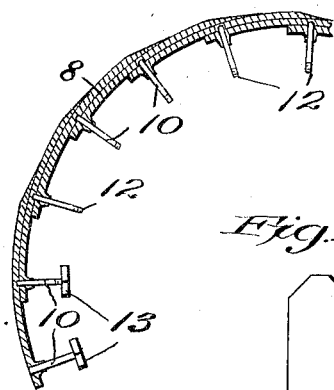
Witnesses:
C. James Cronin
H. E. Laughlin
Inventor
Leonard Smido
By Victor J. Evans
Attorney

UNITED STATES PATENT OFFICE.

LEONARD SMIDO, OF NEW ROCHELLE, NEW YORK.

TIRE.

1,067,768.

Specification of Letters Patent.

Patented July 15, 1913.

Application filed August 13, 1912. Serial No. 714,334.

*To all whom it may concern:*

Be it known that I, LEONARD SMIDO, a subject of the Emperor of Austria-Hungary, residing at New Rochelle, in the county of Westchester and State of New York, have invented new and useful Improvements in Tires, of which the following is a specification.

This invention relates to pneumatic tires and more particularly to that class known as armored tires in which the tread surface of the outer casing or shoe is provided with a series of flexible, overlapping plates which break joint with each succeeding row.

The object of the invention is to provide a simple and comparatively cheap tire of this character that will be practically punctureproof, and one whereby the life of a tire will be greatly prolonged.

To these ends the invention consists in the novel details of construction and combination of parts more fully hereinafter described and particularly pointed out in the claim.

Referring to the accompanying drawings forming a part of this specification in which like numerals designate like parts in all the views:—Figure 1 is a cross sectional view of my improved tire. Fig. 2 is a plan view of a portion of the tread surface. Fig. 3 is a longitudinal sectional view of the tread surface showing the arrangement of the flexible plates, and Fig. 4 is a detail plan view of one of the flexible plates.

My improved pneumatic tire 1 preferably of the shape shown, comprises the outer rubber casing or shoe 2, and inner tube 3 between which is held a suitable lining 4 preferably made of heavy canvas or the like.

The outer casing or shoe 2 is provided with the tread portion 5 and clencher portion 6, which clencher portion is adapted to be securely held to the rim of the wheel in any well-known manner. The tread portion of the casing is reduced in thickness as indicated at 7, and in this reduced portion is adapted to be held a plurality of flexible plates 8 arranged so as to break joint as shown in Fig. 2. These plates are preferably of the shape shown on the drawings, are detachable and each is provided on its inner end, with oppositely disposed semicircular openings 9. These openings on the various plates are adapted to register with others to provide sockets to hold retaining pins 10, which pins pass through holes 11 in the outer casing and are provided on their inner or screw threaded end 12, with retaining nuts 13. The plates cover the whole tread portion of the tire and are arranged in a series of rows, with each succeeding row overlapping the preceding and breaking joint as shown in Fig. 2.

The canvas lining 4 is used as a protector and is placed between the retaining nuts 14 and the inner tube 3, and thereby prevents the inner tube from becoming pinched when it is inflated or when the tire is in use on a vehicle wheel.

After the tire has been inflated the plates rigidly lock themselves together, thereby forming a rigid and flexible metallic covering capable of withstanding long and rough use. Should some of the plates become worn or broken, they may be readily removed and replaced by simply deflating the tire and removing the same from the rim in the usual manner.

It is obvious that those skilled in the art may vary the details of construction and arrangements of parts without departing from the spirit of my invention and therefore I do not wish to be limited to such features except as may be required by the claim.

What is claimed as new is:

A tire, having a flexible outer casing and a canvas web fitting inside of said casing, an air-tight flexible inner tube and a flexible metallic armor composed of a plurality of overlapping plates, a pin fixed upon the inner side of each of said plates disposed approximately at the central part thereof and extending inwardly between the sides of the underlying plates through segmental spaces therefor provided in the edges of said plates, and through openings provided in the casing, said pins having threaded inner ends and threaded disks adapted to serve as nuts for securing the pins whereby the plates are held detachably upon the casing, said canvas web being disposed between said disks and the inner tube.

In testimony whereof I affix my signature in presence of two witnesses.

LEONARD SMIDO.

Witnesses:
JOHN A. DONEGLE,
GEO. A. BYRNE.

Copies of this patent may be obtained for five cents each, by addressing the "Commissioner of Patents, Washington, D. C."